United States Patent

Suzuki et al.

[11] Patent Number: 5,580,156
[45] Date of Patent: Dec. 3, 1996

[54] MARKER APPARATUS

[75] Inventors: Yoshio Suzuki; Nobuo Matsukawa; Kazunori Tamura, all of Shizuoka, Japan

[73] Assignee: Koito Manufacturing Co., Ltd., Tokyo, Japan

[21] Appl. No.: 527,875

[22] Filed: Sep. 14, 1995

[30] Foreign Application Priority Data

Sep. 27, 1994 [JP] Japan ................................. 6-256082

[51] Int. Cl.⁶ ................................................. F21V 29/00
[52] U.S. Cl. ..................... 362/184; 362/240; 362/241; 362/373; 362/802; 362/800; 362/297; 362/346; 116/63 P
[58] Field of Search ..................... 362/184, 186, 362/190, 191, 373, 235, 236, 237, 240, 241, 246, 247, 249, 252, 276, 293, 294, 297, 307, 308, 328, 329, 339, 346, 431, 410, 414, 253, 800, 802; 116/63 R, 63 P, 63 C

[56] References Cited

U.S. PATENT DOCUMENTS

| | | | |
|---|---|---|---|
| 1,574,449 | 2/1926 | Simons | 362/241 X |
| 3,005,193 | 10/1961 | Knapp et al. | 362/190 |
| 3,539,801 | 11/1970 | Bobrick | 362/240 X |
| 3,817,596 | 6/1974 | Tanaka . | |
| 3,834,789 | 9/1974 | Brudy | 116/63 P |
| 4,047,150 | 9/1977 | Kelly | 362/191 X |
| 4,271,408 | 6/1981 | Teshima et al. | 362/800 X |
| 5,253,150 | 10/1993 | Vanni | 362/215 X |
| 5,319,365 | 6/1994 | Hillinger | 362/191 X |
| 5,436,809 | 7/1995 | Brassier et al. | 362/61 |

*Primary Examiner*—Denise Gromada
*Assistant Examiner*—Thomas M. Sember
*Attorney, Agent, or Firm*—Koda and Androlia

[57] ABSTRACT

A marker apparatus including a retroreflector constituted by three reflective surfaces arranged on three surfaces of a trigonal pyramid and a light source disposed on an optical axis of the retroreflector. A lens is provided in front of the retroreflector and a condensing lens is formed on the lens for condensing light emitting from the light source. A plurality of retroreflectors are provided continuously on the same plane in such a manner that directions of the three reflective surfaces, which constitute each of the retroreflector, are different from one another, and a front view of the retroreflector is regular hexagonal. A wall surface is formed between the three reflective surfaces constituting each retroreflector so that the wall surface directed in parallel with an optical axis.

31 Claims, 7 Drawing Sheets

MARKER APPARATUS

BACKGROUND OF THE INVENTION

Field of the Invention

The present invention relates to a marker apparatus for a display utilizing a reflection light beam and a light source light beam, which is particularly constructed mainly by a retroreflector.

A conventional marker apparatus for traffics utilizing a retroreflector has been proposed. A reflector constituted by a trigonal pyramid a vertical angle of which is a right angle or a reflective member constituted by a prism reflects, as well known, incident light beam toward 180° opposite direction. Therefore, if they are practiced as a traffic marker and disposed on a road boundary such as a shoulder of the road, they reflect light beam emitting from an automotive headlamp back to a driver of the vehicle, so that the vehicle driver can recognize the road boundary and, thus, they can contribute to the safety drive. The marker of such a reflection type requires no power source as different from the other marker having a light source. However, because the reflection type marker negatively receives light beams to be reflected, the efficiency of recognition is limited especially in a case of a cloudy day in which surroundings are relatively dark but automotive headlamps are not turned on.

On the other hand, another marker apparatus employing a light source such as a bulb, an electronic flash or the like has been also proposed. This type of the marker apparatus positively emits light beam, and effective in respect of improving the recognition efficiency. However, if amount of light emitting from the light source is small, the recognition efficiency is also small, and it is difficult to achieve a desired performance. In contrast, if the light amount is large, the power consumption is increased and, accordingly, it is necessary to use the commercial power as a power source when used for a long time. In the latter case, electric codes must be connected to the marker lamp for supplying electric power, so that the marker apparatus must be large and bulky.

In view of the foregoing problems, there has been proposed still another type of marker apparatus in which both reflected light beam and light-source beams are employed. For example, Unexamined Japanese Utility Model Application No. Sho. 57-205185 discloses light emitting elements such as LEDs or the like serving as a light source, and light beam emitting from the light emitting elements are projected through a beam transmission plate. Further, a retroreflection lenses are arrayed at surroundings of the beam transmission plate, and light beam reflected by the retroreflection lenses are utilized for achieving the mark function. Thus, using both the reflected light beam and the light-source beam, the rate of load of the light emitting elements is decreased to thereby reduce the power consumption for the light emitting element, whereas, on the other hand, the recognition efficiency of the marker apparatus as a whole is enhanced by using owing to the mark functions of both the light emitting element and the retroreflection lenses.

However, since the Unexamined Japanese Utility Model Application No. Sho. 57-205185 merely uses both the light emitting element and the retroreflection lenses alone, each of the light emitting element and the retroreflection lenses independently functions as a marker. That is, no large involutional effect owing to an interaction of the both markers can be expected. Particularly, since the light emitting elements merely emit light to transmit through the beam transmission plate, although light distribution characteristics can be controlled by lens steps formed on the beam transmission plate, the beam condensibility or beam diffusibility is not freely adjusted, and the enhancement of the recognition efficiency is so limited. Further, since the retroreflection lenses are formed by fine lens steps, if an area of the lens is enlarged to enhance the recognition efficiency, the number of lens steps are also increased. Therefore, the production of the lens and also the production of a mold apparatus for producing the lens would be difficult.

SUMMARY OF THE INVENTION

The present invention was made in view of the foregoing difficulties accompanying the conventional marker apparatuses. Therefore, an object of the present invention is to provide a marker apparatus capable of improving the recognition efficiency of a marker utilizing the multiplier effect of a light-source beam and a reflected light beam.

Another object of the present invention is to provide a marker apparatus capable of enhancing the recognition efficiency of a marker by controlling the beam condensibility and beam diffusibility of light while reducing a consumption power supplied to a light source.

Still another object of the present invention is to provide a marker apparatus capable of enlarging an area of a retroreflector whereas producing the same easily.

The above and other objects can be achieved by a provision of a marker apparatus which, according to the present invention, includes a retroreflector constituted by three reflective surfaces arranged on three surfaces of a trigonal pyramid and a light source disposed on an optical axis of the retroreflector.

A lens is preferably provided in front of the retroreflector and a condensing lens is preferably formed on the lens for condensing light emitting from the light source. Further, a plurality of retroreflectors are preferably provided continuously on the same plane in such a manner that directions of the three reflective surfaces, which constitute each of the retroreflector, are different from one another. Furthermore, a front view of the retroreflector is preferably regular hexagonal and wall surfaces are preferably formed between the three reflective surfaces constituting each retroreflector so that the wall surface directs in parallel with an optical axis.

According to the marker apparatus of the present invention, incident light beam is retroreflected by a retroreflector towards 180° opposite and, at the same time, a light source is turned on to emit light beam frontward, so that the retroreflected light beam from the retroreflector and the light beam emitting from the light source cause a multiplier action thereby to accomplish a very high recognition efficiency of the marker. In particular, the light beam emitting from the light source can be reflected by the retroreflector and, therefore, the light source emitting a small intensity of light can illuminate to a wide range. Thus, the power consumption can be reduced. Further, since the retroreflector is constituted by the three reflective surfaces, the reflection area can be enlarged compared to a retroreflective lens, i.e., a prism, so that the retroreflector can accomplish an extremely high recognition efficiency. Furthermore, by arranging the plurality of retroreflectors interconnectingly on the same plane, the retroreflection effect can be applied to a wide area, thereby to further improve the recognition efficiency.

DESCRIPTION OF THE PREFERRED EMBODIMENTS

Figure 1:
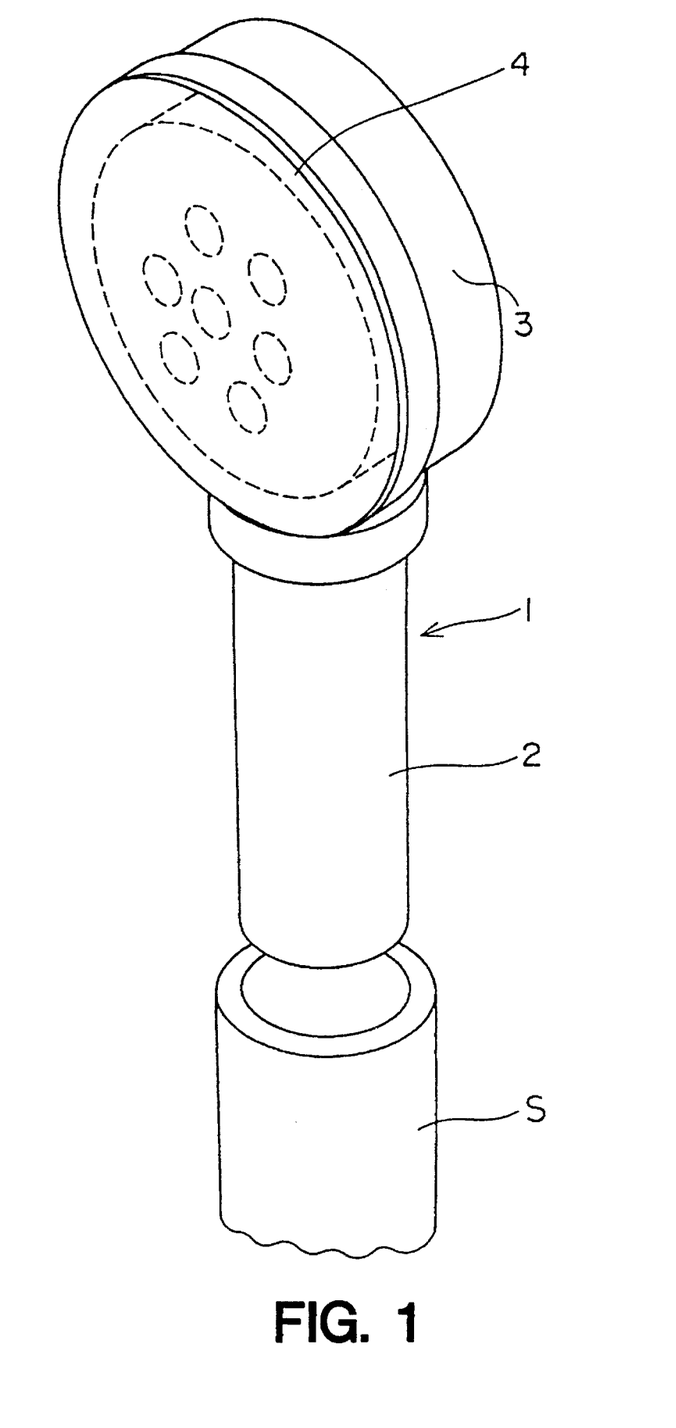
FIG. 1 is a perspective view showing a marker apparatus according to one embodiment of the present invention.
Figure 2:
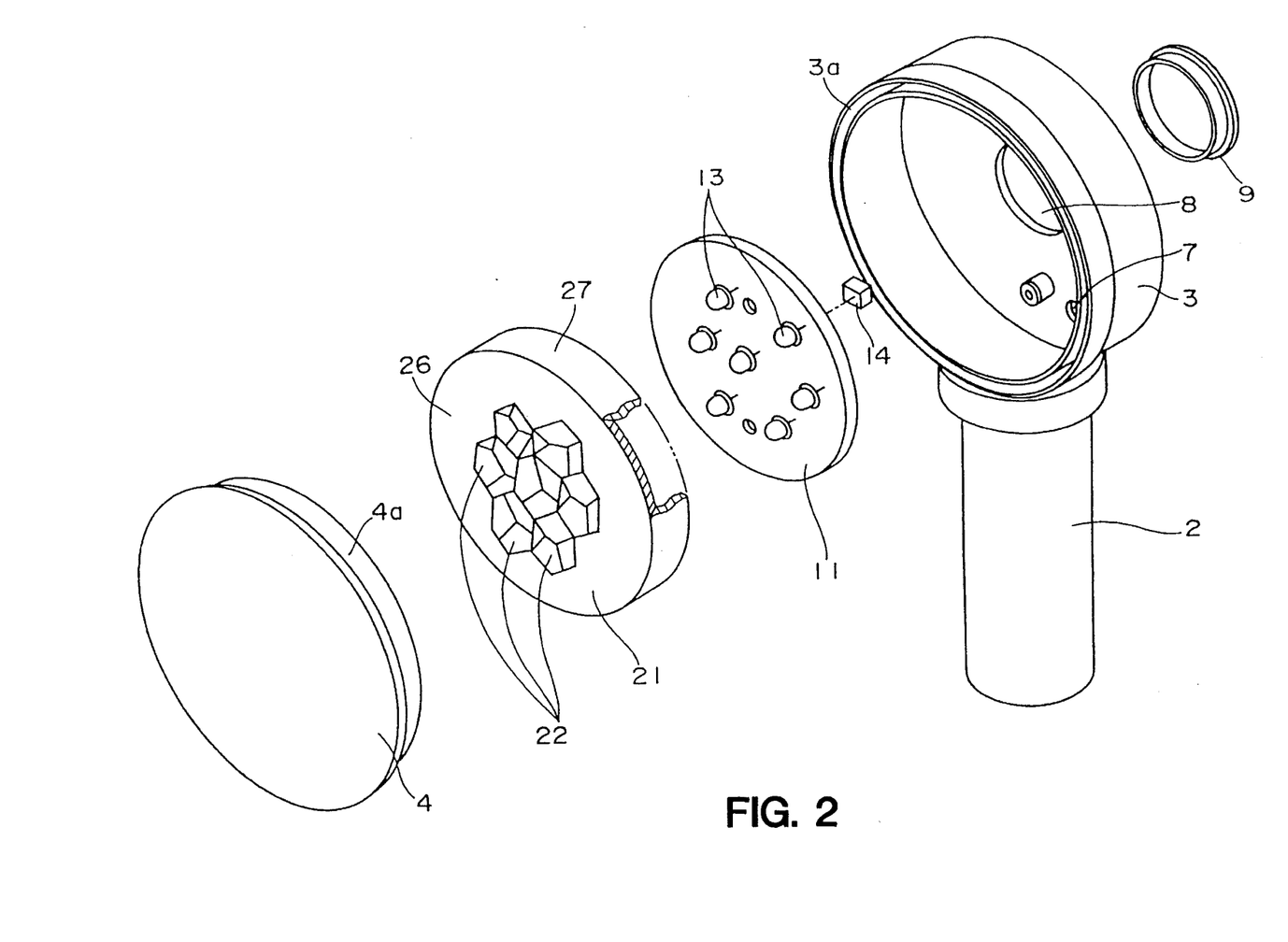
FIG. 2 is a perspective view of the marker apparatus which is partially exploded shown in FIG. 1.
Figure 3:
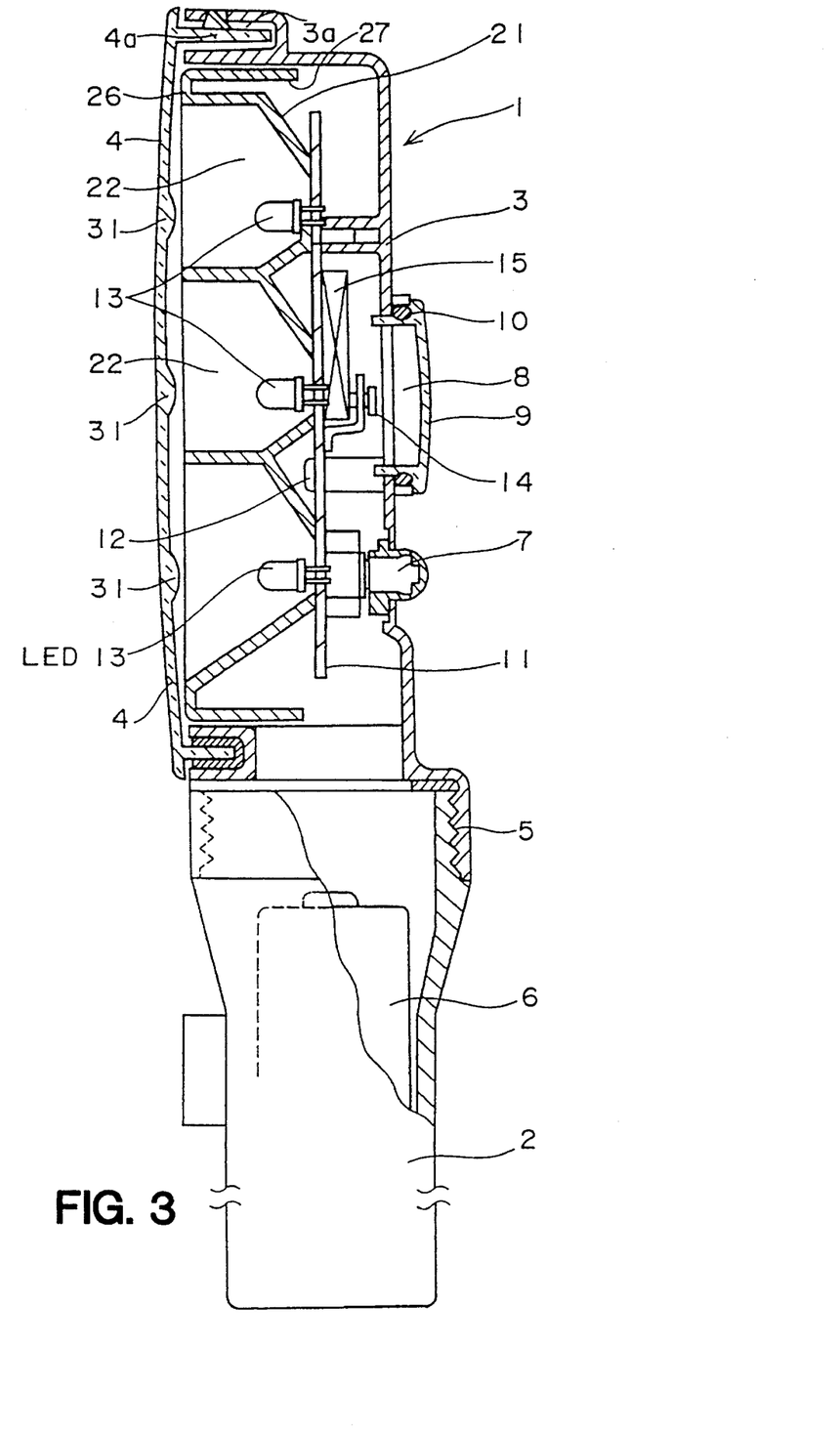
FIG. 3 is a side view showing a partially cut out marker apparatus shown in FIG. 1.

A preferred embodiment of the present invention will now be described in detail with referenced to accompanying drawings. FIG. 1 is a view showing an outline of a marker apparatus according to an embodiment of the present invention, FIG. 2 is a perspective view of the marker apparatus which is partially exploded shown in FIG. 1, and FIG. 3 is a side view showing a partially cut out marker apparatus shown in FIG. 1. A marker apparatus 1 is provided with a cylindrical casing 2, a circular deep dish-shaped body 3 detachably disposed on an upper end portion of the casing 2, and a disc-shaped lens 4 mounted on a front opening of the body 3. The casing 2 and the body 3 are detachably connected to each other by, for example, a screw 5, so that a dry battery 6 can be set when the body 3 is detached from the casing 2. An air hole 7 is formed in a back surface of the body 3 for communicating inside of the body 3 with outside thereof, and a window 8 for leading light to an optical sensor described later opens in the back surface of the body 3. The light leading window 8 is covered with a transparent cover 9 through an O-ring 10 to liquid seal the window 8.

A circular substrate 11 is fixed by a screw 12 within the body 3 along an inner bottom surface of the body. A plurality of light emitting elements 13 such as LEDs are installed on a front surface of the substrate 11, whereas an optical sensor 14 such as a photodiode and a circuit part 15 are installed on a back surface of the substrate 11. The LEDs 13 are arrayed on a plane to correspond to a shape of retroreflectors described above. The optical sensor 14 is mounted at an approximately center position of the back surface of the substrate to face the light leading window 8 formed in the body 3. The circuit part 15 is provided with a various kinds of electronic devices for constituting an electrical circuit with the dry battery 6 accommodated in the casing 2, the LEDs 13 and the optical sensor 14, so that the LEDs 13 are actuated to emit light beams in accordance with an output condition of the optical sensor 14.

Figure 4A:
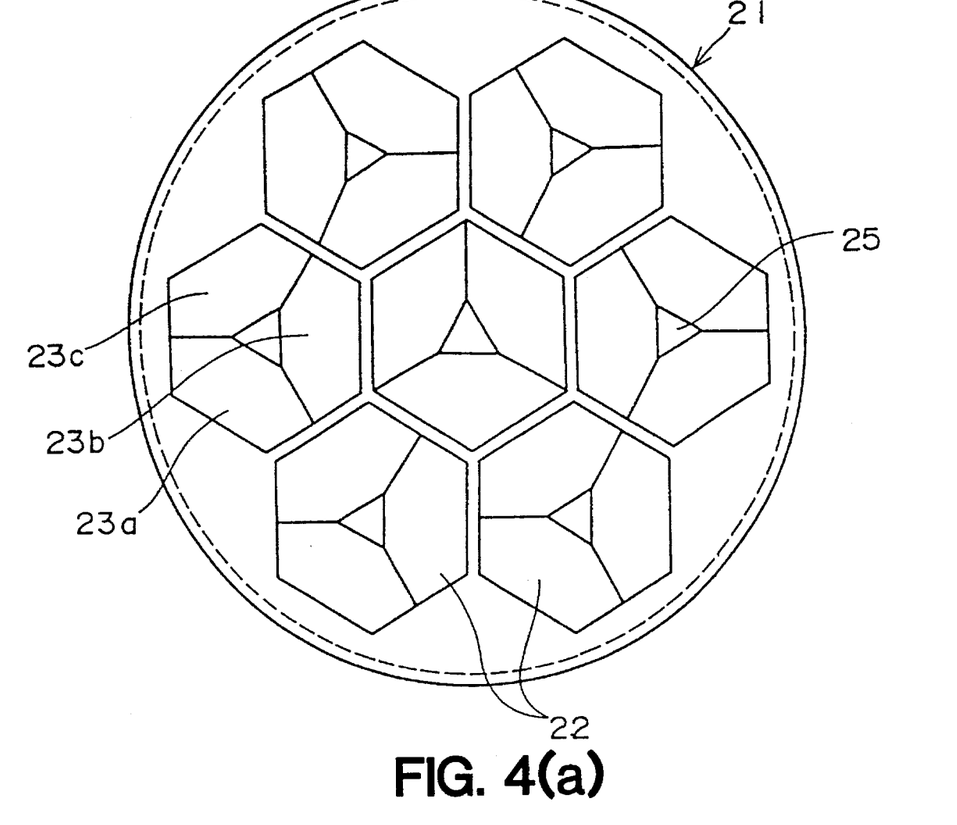
FIG. 4A is a front view of a retroreflector.
Figure 4B:
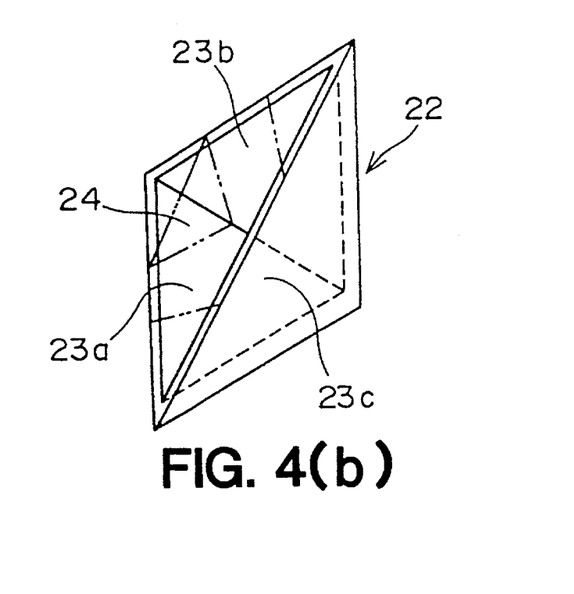
FIG. 4B is a fundamental structure of the retroreflector.

A retroreflector body 21 is disposed in front of the substrate housed in the body 3. The retroreflector body 21 may be assembled on the substrate or on the body 3. In the present embodiment, the retroreflector body 21 is adhered by the substrate 11 to be securely supported thereby. The retroreflector body 21 is formed by resin material as shown in FIG. 4A, which shows a front view of the body 21, and a surface of the resin is subjected to an aluminum deposition treatment to constitute a reflective surface, so that a plurality of retroreflectors 22 are continuously disposed on the same plane. Each of the retroreflector 22 is constituted by a trigonal pyramid having three reflective surfaces 23a, 23b and 23c which cross perpendicularly to one another at apices thereof as shown in FIG. 4B. In the present embodiment, as shown by two-dashed line in FIG. 4B, a configuration of the retroreflector 22 is made regular hexagonal in front view to form a partition wall surface 24 directing in parallel with an optical axis at a position of boundaries or junctions between each of the reflective surfaces 23a to 23c. Thus, the retroreflector body 21 is constituted by the retroreflectors 22 arranged in a honeycomb configuration.

According to the afore-described embodiment, further, directions of edge lines of each of the retroreflector 22, which edge lines are defined by three reflective surfaces crossing by an angle of 120° when viewed from the front, are different from those of the other retroreflector 22. In the embodiment, there are provided some retroreflector 22 having the three edge lines directing to an apex of the regular hexagon of the front view and the other having the three edge lines directing perpendicular to each of side lines of the regular hexagon. In this case, one edge line of the former retroreflector directs up or down whereas one edge line of the latter directs left or right.

Figure 5A:
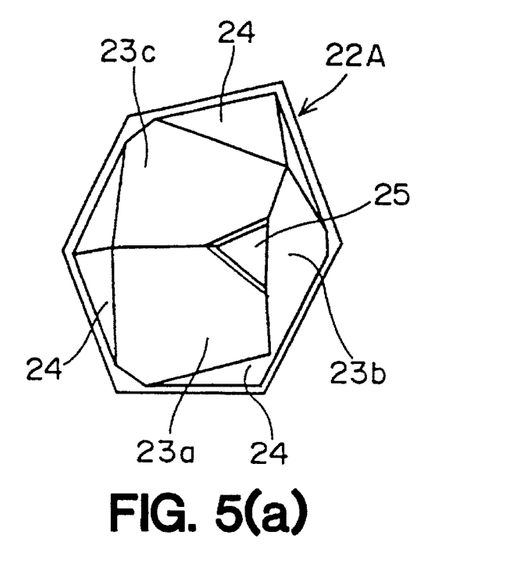
FIGS. 5A and 5B are perspective views showing two different types of each of the retroreflectors employed by the present embodiment.
Figure 5B:
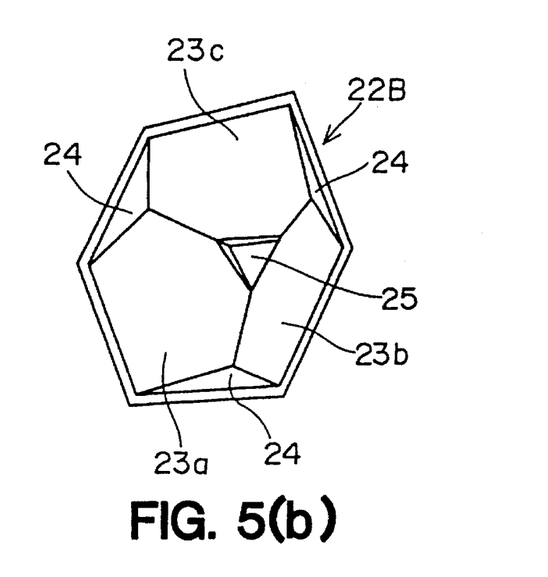

More specifically, FIG. 5A is a perspective view showing a retroreflector 22A of the former type having one edge line directing upward and the other two edge lines directing downward which are inclined to each other by 120°. In this type of retroreflector, vertical wall surfaces 24 are formed on each of the three reflective surfaces 23a, 23b and 23c at positions of an upper apex and left and right lower apices of a regular hexagonal opening. On the other hand, FIG. 5B is a perspective view showing a retroreflector 22B of the latter type having one edge line directing leftward and the other two edge lines directing rightward which are inclined to each other by 120°. In this type of retroreflector, vertical wall surfaces 24 are formed on each of the three reflective surfaces 23a, 23b and 23c at positions of crossings between the three edge lines and lines of the regular hexagonal opening.

An apex part of each of the retroreflectors 22 is cut out to form a triangular hole 25, and the retroreflectors 22 are mounted on the substrate 11 at a certain position so that each of the triangular holes 25 corresponds to a respective LED 13 arrayed on the substrate 11. A circular flange 26 is formed integrally with and at circumference of the retroreflectors 22 to correspond to the shape of the body 3. The flange 26 is provided integrally with a short cylindrical sleeve 27 projecting rearward from a periphery of the flange to be extended along an inner peripheral surface of the body 3.

A seal groove 3a is formed along an opening periphery of a front opening of the body 3, and a seal leg part 4a formed along a peripheral portion of the lens 4 is inserted in the seal groove 3a thereby to assemble the lens 4 integrally to the body 3 while sealing the inside of the body 3 with a seal agent filled in the seal groove 3a. The lens 4 is formed of a transparent resin material and provided integrally with a light condensing step 31, which is constituted by a convex lens, on an inner surface thereof at a position corresponding to an approximately center position of the retroreflectors 22, that is, an optical axis of the LEDs 13. A clear coating is applied to whole surface of the lens 4.

According to the marker apparatus thus arranged, the dry battery 6, LEDs 13, optical sensor 14 and circuit part 15 constitute a circuit not shown as described above. While the optical sensor 14 detects a light transmitting through the light leading window 8 an amount of which light is greater than a predetermined value, the circuit part 15 is disabled. On the other hand, when the outside environment is getting dark and the light amount detected by the optical sensor 14 turns to be lower than the predetermined value, the circuit part 15 is turned on and the LEDs 13 are actuated to emit light beam with power supplied from the dry battery 6 performing as a power source. With respect to the light emission of each of the LEDs 13, it may be preferably designed to be a continuous emission or flasher emission.

Figure 6:
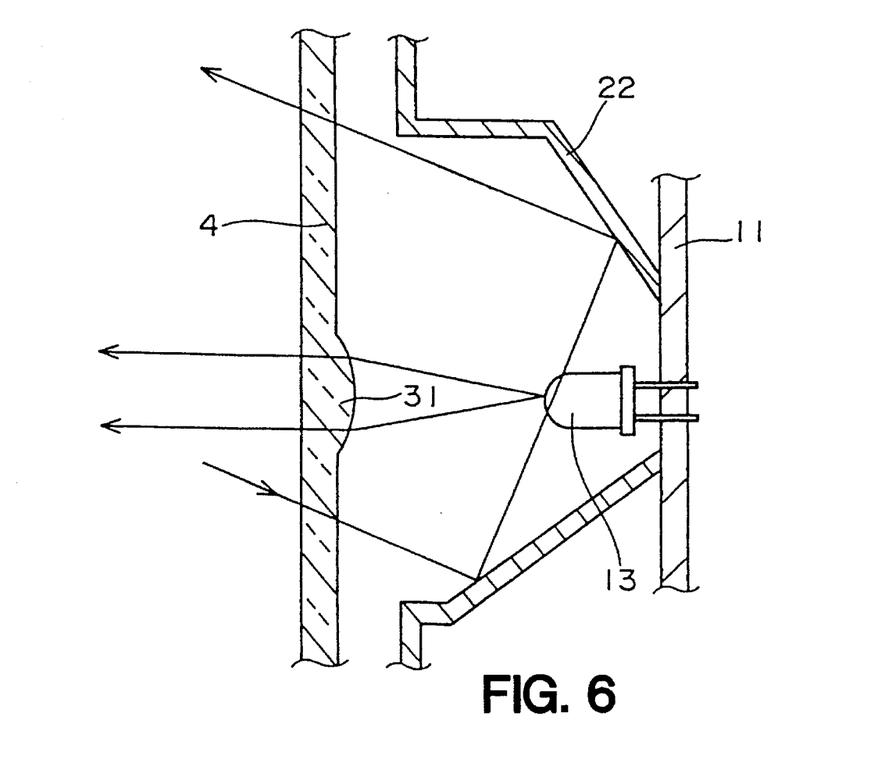
FIG. 6 is a schematic view for explaining an operation of the retroreflector.

When the LED 13 emits light, most of the light directs along an optical axis and condensed by the light condensing step 31 formed on the lens 4 to be a light beam as shown in FIG. 6. On the other hand, the other light emitting from the LED 13 directing sideward is reflected by the respective one of the three reflective surfaces 23a, 23b and 23c of the retroreflector 22 and then transmit through the lens 4. In this condition, since each of the retroreflectors 22 is provided with the wall surfaces 24 as well as the reflective surface, a part of the light emitting from the LED 13 is reflected by the wall surfaces 24. Because the wall surface 24 does not have a retroreflection performance, the reflected light directs the circumferencial direction, so that the light emitting from the LEDs 13 can be further dispersed.

Accordingly, one part of light emitting from the LED 13 is a beam having a small luminous flux width, the other part of the light is a beam having a relatively large luminous flux width corresponding to an area of the reflective surfaces 23a, 23b and 23c of the retroreflector 22, and still the other part of the light is dispersed by the wall surfaces 24 towards the circumferencial directions. Since these light beams are emitted through the lens 4 at the same time, the beam having a small luminous flux width reaches a long range to improve the recognition efficiency from the distanced location, and the other light beam illuminates a substantially whole surface of the lens 4 to enhance the recognition efficiency from the intermediate and short ranges, whereas such a performance can be achieved by a small number of LEDs compared to an area of the lens 4 thereby to reduce a power consumption.

By reducing the power consumption, a long time marker operation can be realized even though the dry battery 6 is employed as a part of the power source, and no wiring is required for supplying a power from the commercial power to the marker apparatus. Further, the marker apparatus can be assembled into one portable unit so that the appliance workability for the marker apparatus and the maintenance thereof can be made easy. For example, the marker apparatus can be easily set, as shown in FIG. 1, by inserting the casing 2 of the marker apparatus into a top opening of a cylindrical pole S.

Furthermore, when the LEDs 13 do not emit light, the incident light from a headlamp of an automobile transmits through the lens 4 and are reflected 180° back through the lens 4 by the three reflective surfaces 23a, 23b and 23c of each of the retroreflector 22 as shown in FIG. 6. The incident light to the flange 26 surrounding the retroreflector body 21 is reflected thereby by an angle which is equal to the incident angle and emitted through the lens 4. For this reason, most of the incident light is reflected back to a driver of the automobile. In this case, since the retroreflector 22 or the retroreflector body 21 can be designed to have a wide area as compared to the conventional retroreflective prism, the retroreflection operation can be performed with a large luminous flux width thereby to enhance the recognition efficiency.

Figure 7A:
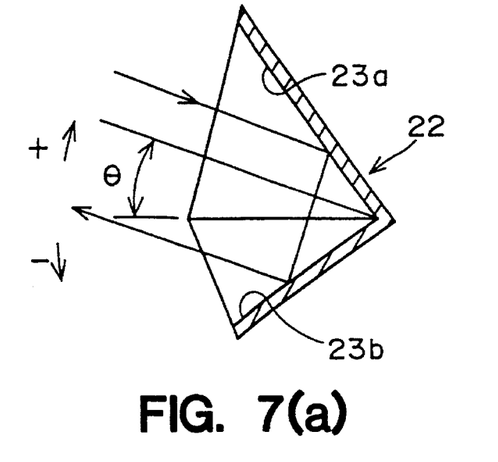
FIGS. 7A and 7B are views showing the operation and a directivity of the retroreflector, respectively.
Figure 7B:
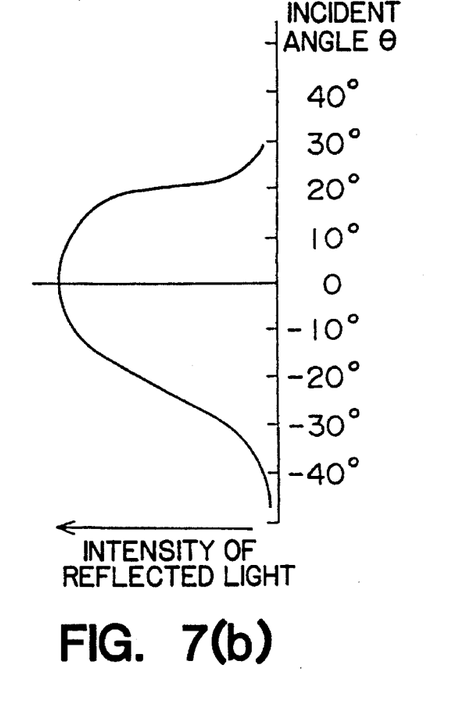

Further, since a direction of angle of the three reflective surfaces 23a, 23b and 23c constituting each retroreflector 22 are different from one another, the directivity of the retroreflection can be equalized in the circumferencial direction including the vertical and horizontal directions. That is, generally in the retroreflection operation, as shown in FIG. 7A, an incident light which is inclined with respect to an optical axis can be reflected 180° back by a retroreflector. However, in a case where a retroreflector is sectioned along a plane including the optical axis, the three reflective surfaces 23a, 23b and 23c are not necessarily symmetrical with respect to the optical axis. In the case as shown in FIG. 7A, the reflective surface 23a is not symmetrical with the reflective surface 23b, which causes a reflection intensity characteristics which is asymmetric depending on the incident angle. FIG. 7B is a graph showing the phenomenon. As shown, when the retroreflector 22 is sectioned along a plane including an edge line thereof, the reflection intensity characteristics is not symmetrical depending on the incident angle of light to the reflective surfaces 23a and 23b which are asymmetric with the optical axis.

However, according to the marker apparatus of the present invention described above, since the reflective surfaces 23a, 23b and 23c of the plurality of retroreflector 22 direct differently from one another, the irregularity of the reflection intensity characteristics of each of the retroreflector 22 are equalized when viewing the retroreflector body 21 as a whole and, therefore, the irregularity is compensated. This is because even though each of the retroreflector 22 has an irregular reflection intensity characteristics as mentioned above, the direction of angle of each of the retroreflectors 22 is different from one another. Therefore, an equal reflection intensity can be obtained in every direction of the marker apparatus.

Figure 8A:
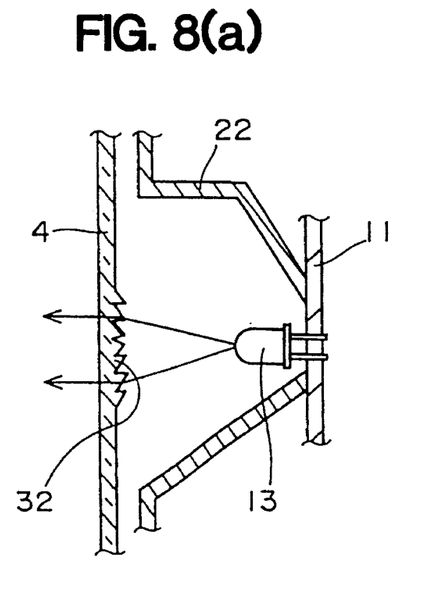
FIGS. 8A and 8B are views showing arrangements of a beam condensing step.
Figure 8B:
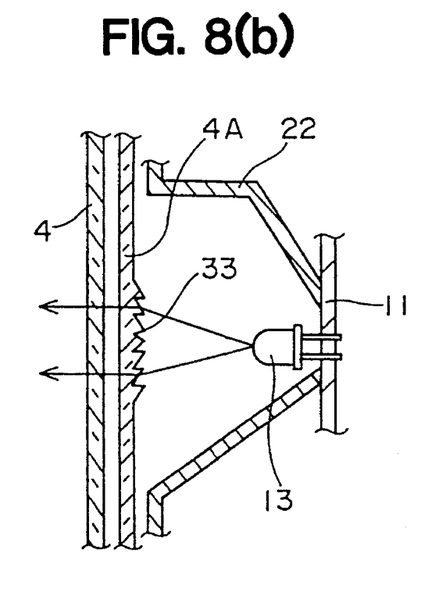

The light condensing step 31 formed on the lens 4 may be a Fresnel step 32 as shown in FIG. 8A. Otherwise, as shown in FIG. 8B, an inner lens 4A is disposed between the retroreflector 22 and the lens 4 and a Fresnel step 33 or light condensing step may be formed on an appropriate portion of the inner lens 4A. In this case, owing to the Fresnel step 32 or 33, the light condensing effect can be accomplished without thickening a thickness of the lens 4 or the inner lens 4A, so that a thin and light-weight marker apparatus can be produced.

Figure 9:
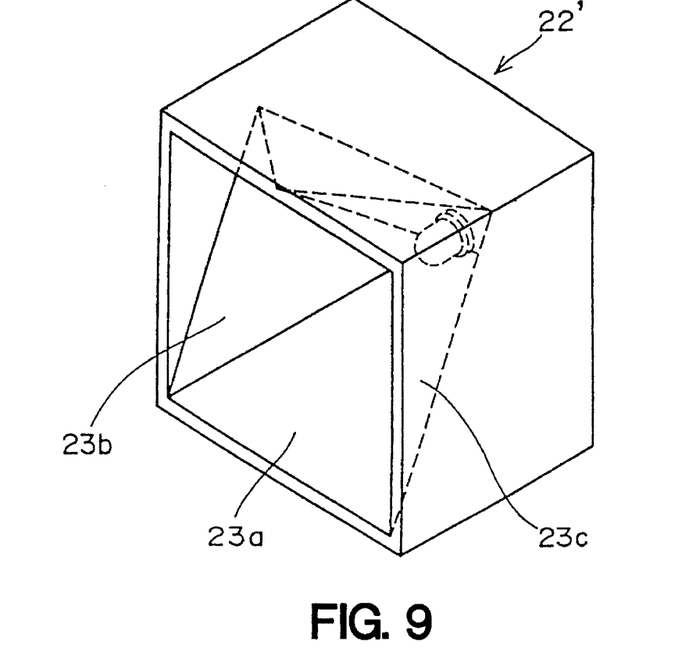
FIG. 9 is a perspective view showing an arrangement of the retroreflector.

Further, each of the retroreflector may be formed by a retroreflector 22' which is regular square in front view as shown in FIG. 9. In this arrangement, a plurality of retroreflectors 22 are arrayed in a matrix arrangement which is very effective if the marker apparatus is applied for a so-called matrix drawing. At the same time, further, an outer contour of the retroreflector including a back surface thereof may be configured cubic or rectangular parallelepiped so that each of the retroreflector can be attached to a mounting panel or the like utilizing the flat back surface.

Figure 10:
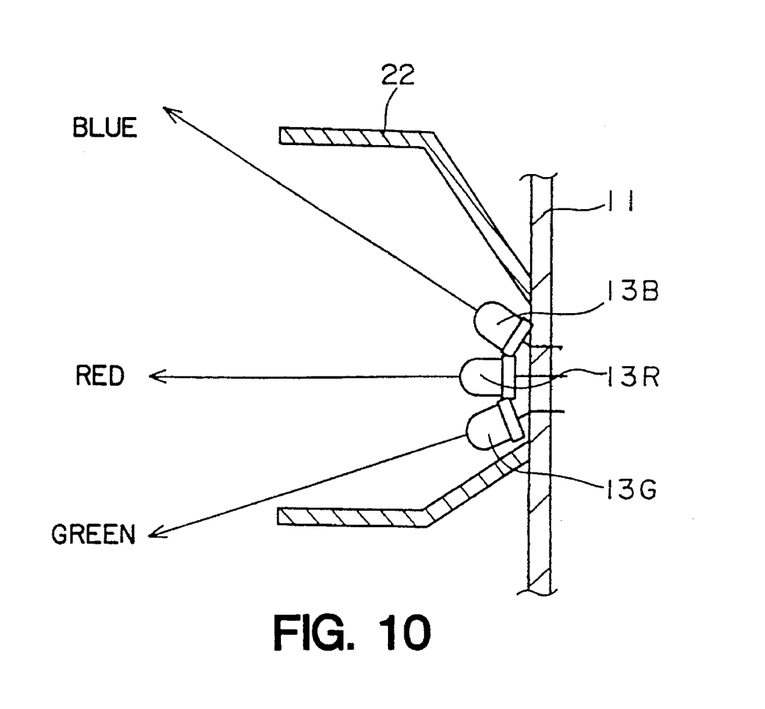
FIG. 10 is a schematic structural view showing another arrangement of the marker apparatus.

Moreover, two or more light emitting elements can be employed as a light source for each of the retroreflector. For example, as shown in FIG. 10, three LEDs 13R, 13G and 13B emitting red, green and blue colors, respectively, may be provided. The LEDs 13R, 13G and 13B may be actuated to emit light selectively or at the same time to obtain the marker operation of various kinds of colors. In this context, each of the LEDs 13R, 13G and 13B may be arranged to have a different optical axis from one another and light beams emitting from the marker apparatus direct differently from one another. As a result, a marking color of the marker apparatus is different in accordance with a viewing angle. The recognition efficiency can thus be further enhanced.

As described above, according to the present invention, since the retroreflector is constituted by a retroreflector constituted by three reflective surfaces arranged on three surfaces of a trigonal pyramid and a light source disposed on an optical axis of the retroreflector, incident light beam is retroreflected by a retroreflector and, at the same time, a light source is turned on to emit light beam frontward, so that the retroreflected light beam from the retroreflector and the light beam emitting from the light source cause a multiplier action thereby to accomplish a very high recognition efficiency of the marker. In particular, the light beam emitting from the light source can be reflected by the retroreflector and, therefore, the light source emitting a small intensity of light can illuminate to a wide range. Thus, the power consumption can be reduced. Further, since the retroreflector is constituted by the three reflective surfaces, the reflection area can be enlarged compared to a retroreflective lens, i.e., a prism, so that the retroreflector can accomplish an extremely high recognition efficiency. Furthermore, by arranging the plurality of retroreflectors interconnectingly on the same plane, the retroreflection effect can be applied to a wide area, thereby to further improve the recognition efficiency.

Further, since a lens is disposed in front of the retroreflector and a light condensing lens is formed on the lens for condensing light emitting from a light source, the light source light can be condensed for emission and, therefore, the recognition efficiency from the distanced location can be enhance.

Further, since a plurality of retroreflectors are arrayed interconnectingly on the same plane, the retroreflection effect can be obtained for a wide area thereby to improve the recognition efficiency.

Furthermore, since a direction of angle of the three reflective surfaces constituting each retroreflector are different from one another, the directivity of the retroreflection can be equalized in the overall circumferencial direction including the vertical and horizontal directions.

Still further, since a front view of the retroreflector is regular hexagonal and wall surfaces are formed between the three reflective surfaces constituting each retroreflector so that the wall surface directs in parallel with an optical axis, the light source light is reflected in the circumferencial direction of the marker apparatus by the wall surfaces, so that the recognition angle of the marker can be enlarged.

What is claimed is:

1. A marker apparatus comprising:
   at least one retroreflector constituted by a trigonal pyramid having three reflective surfaces;
   a light source disposed on an optical axis of said retroreflector;
   a cylindrical casing accommodating therein a battery for supplying electric power to said light source;
   a marker body accommodating therein said retroreflector, said marker body detachably engaging with said casing; and
   a lens mounted on a front opening of said marker body; and wherein
   said marker body comprises an air hole formed in a back surface thereof for communicating an inside of said marker body with an outside thereof, a window formed in the back surface thereof for leading light therein, and a transparent cover mounted on said light leading window through an O-ring.

2. The marker apparatus according to claim 1, wherein said marker body detachably engages with said cylindrical casing by a screw engagement.

3. The marker apparatus according to claim 1, wherein said battery accommodated in said cylindrical casing is a dry battery.

4. The marker apparatus according to claim 1, wherein said light source comprises a light emitting diode.

5. The marker apparatus according to claim 1, further comprising an optical sensor and a control device electrically connecting to said optical sensor, wherein said light source is operated in association with an output signal of said optical sensor.

6. The marker apparatus according to claim 1, wherein said retroreflector is formed of resin and a surface of which is subjected to an aluminum deposition treatment.

7. The marker apparatus according to claim 1, wherein a plurality of said retroreflectors are continuously disposed on a same plane.

8. The marker apparatus according to claim 7, wherein the plurality of said retroreflectors are arranged in a honeycomb configuration.

9. The three marker apparatus according to claim 7, wherein each retroreflector has edge lines in various directions, said edge lines being defined by said three reflective surfaces crossing by an angle of 120° when viewed from a front, are different from those of other retroreflectors.

10. The marker apparatus according to claim 9, wherein the plurality of said retroreflectors comprises a first retroreflector having the three edge lines directing to an apex of a regular hexagon of a front view and a second retroreflector having the three edge lines directing perpendicular to each of side lines of the regular hexagon, and one edge line of said first retroreflector directs up or down whereas one edge line of said second retroreflector directs left or right.

11. The marker apparatus according to claim 10, wherein said first retroreflector comprises one edge line directing upward and the other two edge lines directing downward which are inclined to each other by 120°, and vertical wall surfaces are formed on each of the three reflective surfaces at positions of an upper apex and left and right lower apices of a regular hexagonal opening, and said second retroreflector comprises one edge line directing leftward and the other two edge lines directing rightward which are inclined to each other by 120°, and vertical wall surfaces are formed on each of the three reflective surfaces at positions of crossings between the three edge lines and lines of the regular hexagonal opening.

12. The marker apparatus according to claim 1, wherein said three reflective surfaces of said retroreflector cross perpendicularly to one another at apices thereof.

13. The marker apparatus according to claim 1, wherein said retroreflector has a configuration which is a regular hexagonal shape in a front view and a partition wall surface is formed in a parallel direction with an optical axis at a position of one of boundaries and junctions between each of said reflective surfaces.

14. The marker apparatus according to claim 1, wherein said retroreflector comprises a triangular hole formed by cutting an apex part thereof, and said light source faces said triangular hole.

15. The marker apparatus according to claim 1, wherein said retroreflector comprises a flange formed integrally with and at a circumference of said reflective surfaces to correspond to a contour of said marker body, and said flange comprises a short cylindrical sleeve projecting rearward from a periphery thereof to be extended along an inner peripheral surface of said marker body, and said marker body comprises a seal groove formed along an opening periphery of a front opening thereof, and said lens comprises a seal leg part formed along a peripheral portion thereof, said leg part is inserted in said seal groove.

16. The marker apparatus according to claim 15, wherein a seal agent is filled in said seal groove formed on said marker body.

17. The marker apparatus according to claim 1, wherein said lens is formed of a transparent resin material.

18. The marker apparatus according to claim 17, wherein a clear coating is applied to whole surface of said lens.

19. The marker apparatus according to claim 1, wherein said lens comprises light condensing steps formed on an inner surface thereof at a position corresponding to an approximately center position of said retroreflector.

20. The marker apparatus according to claim 19, wherein said light condensing steps comprises a Fresnel step.

21. The marker apparatus according to claim 19, wherein said lens comprises an outer lens and an inner lens disposed between said retroreflector and said outer lens, and said light condensing steps are formed on an appropriate portion of said inner lens.

22. The marker apparatus according to claim 21, wherein said light condensing steps comprises a Fresnel step.

23. The marker apparatus according to claim 1, wherein said retroreflector has a configuration which is a regular square shape in a front view, and a plurality of said retroreflectors are arrayed in a matrix arrangement.

24. The marker apparatus according to claim 23, wherein an outer contour of the retroreflector includes a back surface which is configured cubic.

25. The marker apparatus according to claim 23, wherein an outer contour of the retroreflector includes a back surface which is configured parallelepiped.

26. The marker apparatus according to claim 1, wherein said light source emits light continuously.

27. The marker apparatus according to claim 1, wherein said light source generates a flasher emission of light.

28. The marker apparatus according to claim 1, wherein said light source comprises two or more light emitting elements.

29. The marker apparatus according to claim 28, wherein said light emitting elements have a different color from one another.

30. The marker apparatus according to claim 29, wherein said light emitting elements have red, green and blue colors.

31. The marker apparatus according to claim 30, wherein each of said light emitting elements is arranged to have a different optical axis from one another and light beams emitting from the marker apparatus are directed directed differently from one another.

* * * * *